(12) United States Patent
Gitt et al.

(10) Patent No.: US 7,731,617 B2
(45) Date of Patent: Jun. 8, 2010

(54) AUTOMATED MOTOR VEHICLE TRANSMISSION AND METHOD OF OPERATING THE SAME

(75) Inventors: Carsten Gitt, Stuttgart (DE); Detlef Schnitzer, Denkendorf (DE)

(73) Assignee: Daimler A.G., Stuttgart (DE)

( * ) Notice: Subject to any disclaimer, the term of this patent is extended or adjusted under 35 U.S.C. 154(b) by 527 days.

(21) Appl. No.: 11/726,718

(22) Filed: Mar. 22, 2007

(65) Prior Publication Data

US 2007/0234834 A1     Oct. 11, 2007

Related U.S. Application Data

(63) Continuation-in-part of application No. PCT/EP2005/006449, filed on Jun. 16, 2005.

(30) Foreign Application Priority Data

| Sep. 23, 2004 | (DE) | ............ 10 2004 046 074 |
| Oct. 22, 2004 | (DE) | ............ 10 2004 051 452 |
| Nov. 13, 2004 | (DE) | ............ 10 2004 054 852 |

(51) Int. Cl.
*F16H 37/04* (2006.01)
(52) U.S. Cl. ............ 475/218; 475/209; 74/333
(58) Field of Classification Search ............ 475/207, 475/209, 218; 74/329, 333
See application file for complete search history.

(56) References Cited

U.S. PATENT DOCUMENTS

| 5,390,559 | A | * | 2/1995 | Thomas et al. ......... 74/325 |
| 6,105,449 | A |   | 8/2000 | Genise et al. |
| 6,440,032 | B1 | * | 8/2002 | Stauber et al. ......... 475/207 |
| 6,709,356 | B2 | * | 3/2004 | Fuhrer et al. ......... 475/207 |
| 6,869,379 | B2 | * | 3/2005 | Voss et al. ......... 475/218 |
| 7,004,878 | B2 | * | 2/2006 | Gumpoltsberger et al. .. 475/218 |
| 7,104,917 | B2 | * | 9/2006 | Klemen et al. ......... 475/302 |
| 7,278,950 | B2 | * | 10/2007 | Steen et al. ......... 475/303 |
| 7,288,044 | B2 | * | 10/2007 | Gumpoltsberger ......... 475/218 |

FOREIGN PATENT DOCUMENTS

| DE | 606 269 | 11/1934 |
| DE | 77 06 003 A1 | 6/1978 |
| DE | 41 17 642 A1 | 3/1992 |
| DE | 42 26 575 A1 | 9/1993 |
| DE | 199 38 934 A1 | 8/1999 |
| DE | 27 08 524 A1 | 8/2000 |
| DE | 100 51 354 A1 | 5/2002 |
| DE | 102 39 396 A1 | 3/2004 |

* cited by examiner

*Primary Examiner*—Ha D. Ho
(74) *Attorney, Agent, or Firm*—Klaus J. Bach

(57) ABSTRACT

In a transmission for a motor vehicle of a reduction gearing design with power branching including a main shaft and a counter shaft, a first component transmission and a planetary gear unit, power is branched to the countershaft by the first component transmission in certain gears and recombined via the planetary gear unit and a direct power transmission path is provided wherein the countershaft is decoupled selectively by means of a control device.

17 Claims, 11 Drawing Sheets

AUTOMATED MOTOR VEHICLE TRANSMISSION AND METHOD OF OPERATING THE SAME

This is a Continuation-In-Part Application of pending International Patent Application PCT/EP2005/006449 filed Jun. 16, 2005 and claiming the priority of German Patent Applications 10 2004 046 074.4, 10 2004 951 453.6 and 10 2004 054 852.8 filed Sep. 23, 2004, Oct. 22, 2004 and Nov. 13, 2004, respectively.

BACKGROUND OF THE INVENTION

The invention relates to an automated transmission of a reduction gearing design having a plurality of discrete transmission stages and power branches for a motor vehicle and to a method of operating such a transmission.

U.S. Pat. No. 5,381,703 and DE 100 51 354 A1 disclose transmissions of a reduction gearing design, in which, in direct gear, an input shaft of the transmission is connected to an output shaft of the transmission so as to rotate with it and without intermediate intermeshing gearwheels. In such a direct gear the countershaft is decoupled from the input shaft and the output shaft gear shifting elements are shifted into a neutral position. In this way it is possible to improve the efficiency in direct gear since the countershaft and transmission elements, which are possibly connected to the countershaft, are not rotating. As a result, it is possible, on the one hand, to reduce the inertia of the drive train. On the other hand, bearing friction and any churning losses of the countershaft with assigned transmission elements in an oil sump do not rotate so that the power loss is minimized.

Furthermore, DE 198 53 824 A1 discloses a double clutch transmission in which the drive torque in one component transmission is transmitted via a countershaft while in another component transmission a direct gear is provided.

If the latter component transmission is activated via the double clutch in direct gear, this is accompanied by a release of the drive connection to the countershaft of the first component transmission by releasing the assigned clutch of the double clutch so that the countershaft is also decoupled from an input shaft of the transmission.

Furthermore, documents DE 27 36 834 A1 and DE 27 36 929 A1 disclose a vehicle transmission of a reduction gearing design, in which power branching takes place in all the forward gears as well as the reverse gear with the exception of a direct, highest gear. For the power branching, a gearwheel of a countershaft has a drive connection both to the one countershaft and to the other countershaft via an intermediate gearwheel which is mounted so as to be rotatable with respect to a main shaft. Power is output by combining the two power paths at a gearwheel which is mounted so as to be rotatable with respect to the main shaft and which has a drive connection at its circumference to, in each case, one gearwheel which has a fixed drive connection to a countershaft. Accordingly, the power is divided between the two countershafts so that it is ensured that the mechanical loading for transmission elements lying in the power flux downstream of the branching point is also halved. However, the abovementioned power branches can be combined only if the two countershafts rotate at the same rotational speed, which makes the periphery conditions for dividing the power outputs between the power branches and the configuration of the possible transmission ratios more difficult.

Finally, WO 03/025431 A1 discloses an automated transmission for a motor vehicle which has a plurality of discrete transmission stages and is of a reduction gearing design. The countershaft has a continuous drive connection to a transmission input shaft via an input constant. At the output end, a three-shaft transmission or variable-ratio gear unit is connected downstream of the reduction gearing unit and thus forms a further component transmission. At the lowest gears, a transmission element of the three-shaft transmission is locked by means of a brake, while the reduction gearing unit is embodied in a customary fashion with a single power branch which extends via the countershaft. For further transmission gears power branching takes place, with a sun wheel of the three-shaft transmission being connected directly to the transmission input shaft in a first power branch, while the second power branch extends via the countershaft. The two power branches are joined in the three-shaft transmission, with the transmission output shaft being coupled to the web of the three-shaft transmission.

Continuously variable transmissions relate to a different branch of technology in which it is necessary to ensure the continuously variable ratio change in transmission power branch by what is referred to as a CVT, together with combination of the power branches in a planetary gear unit. Such transmissions, for example corresponding to DE 199 44 792 A1, DE 196 31 216 A1, U.S. Pat. No. 4,682,511, U.S. Pat. No. 4,662,240 are therefore not transmissions of the generic type with a plurality of discrete transmission stages.

It is the object of the present invention to improve a transmission of the generic type with different shift states, a number of gears that can be implemented and also the synchronization procedures.

Furthermore, it is an object of the invention to improve a method of operating a transmission in a motor vehicle by reducing losses, wear, noise, shifting times and/or shifting processes.

SUMMARY OF THE INVENTION

In a transmission for a motor vehicle of a reduction gearing design with power branching including a main shaft and a counter shaft, a first component transmission and a planetary gear unit, power is branched to the countershaft by the first component transmission in certain gears and recombined via the planetary gear unit and a direct power transmission path is provided wherein the countershaft is decoupled selectively by means of a control device.

According to the invention, a first component transmission of a reduction gearing design is used. As a result, the advantages of transmissions of a reduction gearing design, which are known per se, can be utilized, in particular the advantages of a free configuration of the transmission ratios, a design with standard elements, a high possible number of gears of a reduction gearing design, the possibility of multiplying the number of possible gears by using a plurality of input-end constants, the possibilities of using split groups and/or range groups as well as the compact design of reduction gearing units.

Furthermore, a further component transmission is used which has a transmission stage with a plurality of transmission elements forming drive elements or output elements. These are (at least in component operating ranges) a variable-ratio gear unit, for example a planetary set, or a three-shaft or multi-shaft transmission which permits a plurality of different operating possibilities:

in the case of a drive with at least two input shafts it is possible to generate an output rotation of an output shaft as a result of which two input rotations with the same, or with different, input rotational speeds, and thus form two power branches, can be combined to form one output movement.

If one transmission element is fixed with respect to the housing by means of a brake, for example, or is driven with a defined rotational speed it is also possible for an input movement to be translated into an output movement.

A further mode of operation of the further component transmission is made possible in that the latter rotates in a blocked fashion, as a result of which rolling losses of gearwheels are avoided and a particularly good level of efficiency is made available.

For at least one gear power is transmitted via a single power path. This power path is, for example, one which is customary for reduction gearing units, from the transmission input shaft via the countershaft to a transmission shaft which is connected to a transmission element of the further component transmission, and, in the case of a braked, further transmission element, is transmitted to the transmission output shaft via a third transmission element of the further component transmission.

Furthermore, power branching between at least two power paths takes place for at least one gear in the first component transmission, with both power paths being combined in the further component transmission stage. Owing to the power branching, the power transmitted is reduced in each power path, which results in reduced loading of the transmission elements involved. As a result, the components involved can be smaller and/or the service life of the components can be extended. By using the further component transmission which is embodied as a planetary gear unit, a plurality of shifted states between the input elements and the output elements is possible so that the number of possible shifted states of the transmission is increased by the use of the further component transmission, and depending on the shifted state of the planetary gear unit the transmission ratio from one input movement of the planetary gear unit to the output movement can be varied.

According to the invention, output gearwheels of the first component transmission can be connected to a transmission shaft via gear shifting elements which transmission shaft is thus responsible on a central basis for a plurality of output gearwheels. As a result, at first a simple design and a simple coupling between the transmission shaft and a plurality of output gearwheels is possible. For example, at least one gear shifting element is embodied as a sliding sleeve which, on the one hand, engages the transmission shaft in the circumferential direction a positively locking fashion and optionally also engages one of two output gearwheels.

Accordingly, a drive power, specifically a component thereof or the entire drive power can be transmitted from the transmission input shaft to the transmission shaft via the countershaft via different reduction gearing unit stages. For a further transmission of the drive torque from the transmission shaft two alternative or cumulative paths are possible:

the transmission shaft can be, connected via a gear shifting element to a transmission element of the further component transmission.

Furthermore, the transmission shaft can be connected via a further gear shifting element to another transmission element of the further component transmission.

If the two aforesaid gear shifting elements are both active, it is thus possible according to the invention for two transmission elements of the further component transmission to be driven by the drive movement of the transmission shaft. This may take place for different or identical rotational speeds, with the further component transmission in the block rotating for identical rotational speeds.

Otherwise, if only one gear shifting element is active it is possible to provide drive in a targeted fashion to one transmission element of the further component transmission while, for example, another transmission element of the further component transmission is braked or its rotational speed is predefined or specified in some other way.

The invention is also based on the recognition that according to the genus-forming document the transmission shaft which is assigned to the output gearwheels, a hollow shaft in the case of the genus-forming document, is coupled rigidly and without intermediate connection of a gear shifting element to the internal gearwheel of the variable-ratio gear unit. One gear shifting element is responsible at the same time for coupling the hollow shaft to the housing in a first shifted state as a brake, and to an output gearwheel in a second shifted state. As a result of this the assigned output gearwheel can only be used in a transmission gear with power branching in which the aforesaid brake does not need to be active, while operation of the output gearwheel without power branching is not possible. On the other hand, according to the genus-forming document the hollow shaft is connected to the sunwheel of the variable-ratio gear unit via a gear shifting element, with this gear shifting element being simultaneously operatively connected to an output gearwheel which is assigned to a reverse gear. This means that the hollow shaft with the sunwheel cannot be blocked in the reverse gear. According to the illustrated embodiments, operation in the reverse gear therefore takes place only without power branching, using the brake.

The aforesaid disadvantages of the genus-forming prior art are avoided by the configuration according to the invention, as a result of which there are improved operating possibilities and the number of possible gears is multiplied.

Preferably, at least two input constants are intermediately connected between a transmission input shaft and a countershaft. Said input constants firstly have the advantage that the number of possible gears can be multiplied, in particular doubled, as a result of the transmission paths between the transmission input shaft and countershaft which are made available by the two input constants, and given a suitable selection of the transmission ratios of the input constants they permit fine gradation of the gears.

Furthermore, the transmission has a direct gear in which, for example, the input shaft is coupled directly to the output shaft without intermediate connection of intermeshing gearwheels. Since power losses owing to intermeshing toothings are ruled out in such a direct gear and there is no movement of additional transmission shafts with corresponding friction between the bearings or possible churning losses, such a direct gear constitutes an optimum possibility with respect to the efficiency. The direct gear is preferably employed for a gear which is used for a particularly long time or for particular operating ranges.

According to the invention, a control device is provided which, when such a direct gear has been selected depending on the operating conditions:

couples the transmission input shaft to the countershaft by means of the first input constant, and couples the transmission input shaft to the countershaft by means of the second input constant in another shifted position.

The control device can thus become advantageously active as follows by suitably taking into account operating parameters and/or ambient parameters:

If it is apparent or assumed that the future a gear change will take place from the direct gear into another gear, it is possible, by activating the first or second input constant, to accelerate or pre-accelerate the countershaft precisely to a required future rotational speed, or in the direction of said rotational speed, with the result that the synchronization power for actually executing a necessary gear shifting process is eliminated or reduced, as a result of which the wear on the transmission elements involved is reduced. Alternatively or additionally it is possible to reduce the synchronization time.

On the other hand, the coupling of the countershaft to the transmission elements lying in the power flux in the direct gear means an increase in the moment of mass inertia of the drive train with the need to accelerate the rotating mass which is additionally coupled to the drive train. As a result, energy can be extracted from the drive train, as a result of which it is possible to bring about a braking process or at least to assist such a process. Conversely, energy can be fed into the drive train for a change from an input constant for which the countershaft rotates at a larger rotational speed to another input constant for which a reduced rotational speed of the countershaft is necessary, if an acceleration process is required.

In particular, the countershaft for component operating regions in a direct gear is decoupled from the input shaft and the output shaft. This requires that all the gearwheel pairs between the input shaft and countershaft or between the countershaft and output shaft can be decoupled from the abovementioned shafts at least in the region of an assigned gearwheel. If the abovementioned gear shifting elements are in a neutral position which does not bring about any drive connection between the gearwheels and the assigned shafts, the countershaft is not moved along in the course of the drive movement. As a result, it is possible, on the one hand, to reduce the mass to be moved and possibly accelerated by the drive. This leads to an improved agility of the drive train. To the same extent, a reduction in the moved components and the effective toothings results, under certain circumstances, in smoother operation, reduced generation of heat and lower losses.

Decoupling the countershaft in a direct gear also has the advantage that toothing play between the countershaft and the power-conducting shaft cannot have an adverse effect when the countershaft is not under drive load.

Decoupling the countershaft from the input shaft and the output shaft can be carried out in an automated fashion. Such automated decoupling can be carried out automatically when the direct gear is activated, and deactivation can correspondingly take place when the direct gear is deactivated. Alternatively it is possible for the decoupling and coupling of the countershaft to the transmission input shaft or transmission output shaft to take place with the time offset with respect to the activation or deactivation of the direct gear. It is particularly advantageous if the direct gear is the highest gear since the highest gear is used in particular for long distances as a continuously operated gear so that the increase in the efficiency in the direct gear can be utilized for particularly long operating phases.

According to a further embodiment of the invention, a power path in a gear with power branching runs via the countershaft while the other power path occurs before the combination of the two power branches without the involvement of intermeshing gearwheel pairs and with the transmission ratio i=1. Accordingly, in the gear with power branching the previously mentioned advantages for the direct gear can also be utilized, as a result of which at least one power branch is transmitted with a high level of efficiency, which gives rise to a high overall level of efficiency.

According to a further advantageous configuration of the vehicle transmission, at least one gear in which the power branching takes place is adjacent to the direct gear in terms of the transmission ratio. Accordingly, both the direct gear and the at least one adjacent gear with power branching form a group of gears in which a particularly good level of efficiency can be achieved. The result of this is that, for example when traveling on a motorway or when traveling on a country road, it is still possible to assume a high level of efficiency when changing from the direct gear into an adjacent gear. On the other hand, for one particular variant of the invention it is possible that, for the power branching, one power path transmits the drive torque into the direct gear in accordance with the power flux. A result of this is, on the one hand, that the efficiency advantages of a power flux via a direct gear can also be utilized for the power branching, resulting in an improved overall level of efficiency. On the other hand, at least in one power path it is not necessary to activate any gear shifting elements for a change from a gear in which the power branching takes place to the direct gear (and vice versa), which reduces the expenditure on shifting gears.

According to a further proposal of the invention a multifunctional gear shifting element is provided which
  in one shifted state couples a transmission element of the further component transmission to the transmission input shaft,
  in another shifted state couples the transmission input shaft both to the transmission element of the further component transmission and to the other transmission element of another component transmission, with the result that the latter rotates as a block or the transmission output rotational speed depends on the rotational speed of the gear shifting element and
  in a third shifted state couples the transmission element of the further component transmission to the other transmission element of the further component transmission, with the result that the further component transmission rotates as a block.

This permits a particularly simple design of the transmission accompanied by a variety of possible ways of transmitting the drive movement.

In accordance with a further embodiment of the invention the step jumps between respectively adjacent gears are smaller between high gears than between low gears. This configuration is based on the knowledge that a comparatively small torque is available for acceleration processes at high gears owing to the transmission ratio present, with the result that an agile acceleration behavior is required, that the step jumps are smaller here than in low gears in which, owing to the transmission ratio, a high torque is available for accelerating the motor vehicle.

According to a further proposal of the invention, in order to block the variable-ratio gear unit in the direct gear a clutch connects a sun wheel to an internal gearwheel so as to rotate with it. As a result, efficiency losses as a result of rolling contacts between the transmission elements of the variable-ratio gear unit can be avoided in the direct gear.

One development of the vehicle transmission according to the invention is obtained if the first component transmission has a split transmission so that a component gear of the first component transmission can be used with the same shifted state of the multi-element transmission stage in two overall transmission ratios of the vehicle transmission for different split gears of the split transmission. Accordingly, a number of available gears can easily be multiplied, in particular doubled, by means of an additional split transmission which has, for example, only two split gears.

In the transmission according to the invention, a control device is preferably provided. Such a control device may be a device which serves only the purpose mentioned below or further purposes in addition to the purpose mentioned, with the result that it is of multifunctional design. Such a control device may interact with, or be networked with, other control devices. Alternatively or additionally it is possible for the control device to be of integral design with control devices for other functions.

According to one embodiment of the invention, the control device is used to predict whether a braking process will take place in the near future. For this purpose, suitable vehicle parameters, driver parameters, ambient parameters and/or operating parameters are fed to the control device. For example, it is possible to predict that a braking process will take place in the near future according to the presence of a fault criterion or failure criterion of the motor vehicle or of an individual component, as a result of GPS data about imminent positive gradient values and/or bends in the road, as a function of the accelerator pedal signals, the power demand values, rotational speeds, changes in rotational speed and/or gradients of the rotational speed of the drive assembly, information from a distance measuring system about an adjacent vehicle, an accident early-detection means or the like. If a future braking process is predicted in the direct gear by the control device, the countershaft can be driven in an automated fashion, by activating a gear shifting element. When the drive connection is formed via the gear shifting element, the centrifugal mass, to be converted to the drive train which is active in the direct gear, of the countershaft (with additional active transmission elements) becomes continuously or instantaneously active, with the result that a braking effect is generated as a result of the acceleration of the centrifugal mass. This braking effect of the drive train can be used as an alternative to, or in addition to, other brakes. In particular, a gear shifting element is used which has such a transmission ratio that a large change in the centrifugal mass to be converted is reduced as a result of the activation of the gear shifting element, that is to say with said gear shifting element the countershaft carries out a rotation movement which is as fast as possible.

It is possible, without departing from the scope of the present invention, to connect the countershaft by activating the gear shift element both when the drive assembly is connected to the vehicle wheels via the direct gear and for a released power output element.

According to one development of the present invention, it is possible to make a forecast, in the same control device or an additional control device in the direct gear, as to whether a future change from the direct gear to another gear, for example an adjacent gear or what is referred to as a double down-shifting operation. As a result, the control device takes into account measurement variables, operating parameters, ambient parameters such as, for example, a power adjustment parameter of the driver, a driver type identifier, road values such as positive gradients or bend parameters, in particular on the basis of a GPS system or an automatic bend detection means, a system for warning about distances from an adjacent vehicle, empirical values of a preceding time period and/or gear shifting characteristic curves. If such a future change of the gear is predicted, there is a high probability that a drive movement is to be transmitted via the countershaft for the future gear. It is appropriate for the "predictor" also to provide information about which gear is highly likely to be selected and to set up a drive connection to the countershaft only if the latter is advantageous in the gear which is highly likely to be selected in terms of the expenditure on shifting gears, the gear shifting time and/or the wear involved in shifting gears. Likewise, it is possible that the "predictor" selects the suitable input constant for coupling the countershaft. The methods and devices which are known per se can be used as the predictor, and reference is made, by way of example, to the document DE 101 02 016 A1, the prior art mentioned in said document and to further citations of this document and to documents relating to the predictor methods in the same IPC class.

According to the invention, a drive connection is therefore set up to the countershaft even before a change to the future gear is made by the control device activating, in an automated fashion, a gear shifting element which connects the countershaft to the input shaft or to the output shaft via a drive connection which will probably be required later. For a later execution of the actual gear shifting process for the future gear (countershaft transmission stage or gear with power branching) all that is then necessary is to activate a further gear shifting element between the countershaft and output shaft or input shaft in order to ensure the power flux between the input shaft and output shaft via the countershaft (if appropriate further gear shifting elements must also be moved into a neutral position). According to the invention it is thus possible to avoid a situation in which a plurality of gear shifting elements have to be activated simultaneously for the power flux in the future gear. As a result, it is possible, under certain circumstances, to reduce gear shifting times and/or to avoid undefined drive states of the countershaft. Furthermore, the automated activation of the gear shifting element for preparing the gear change can, under certain circumstances, be carried out over an extended time period, which reduces strain on the gear shifting elements. Furthermore, the activation media (compressed air in the case of pneumatic activation, hydraulic medium in the case of hydraulic activation or electric power in the case of electric activation) necessary for the actual gear shifting process can be reduced by executing in future a "component gear shifting process" or "component synchronization process".

According to a further proposal of the invention, the transmission has a control device which, when there is a change into the direct gear, checks an activation criterion continuously or cyclically. The activation criterion provides a difference of information as to whether it is appropriate to decouple the countershaft from the input shaft and the output shaft.

For example, the activation criterion may be a time period for which the direct gear has to be active. In particular, the countershaft is thus not decoupled until the direct gear has been selected for a minimum time and a future relatively long operation of the direct gear is thus inferred. Likewise, by means of power adjustment parameters, pedal values, operating parameters or ambient parameters (see above) it is possible, for example, to acquire an activation criterion which expresses a probability as to whether the direct gear will be operated for even longer in future and it is advantageous to decouple the countershaft. Likewise, the activation criterion may be acquired by detecting, for example by means of a GPS system, whether the motor vehicle is moving on the roadway and thus a relatively long operation of the motor vehicle in the direct gear can be expected. According to the invention it is thus possible to avoid the countershaft being unnecessarily decoupled for a rapid change down from the direct gear into another gear, while for relatively long operating ranges within the direct gear the countershaft is decoupled from the input shaft and from the output shaft, as a result of which the efficiency advantages can be utilized.

A method according to the invention represents another solution to the object on which the invention is based.

According to said solution, a control unit is capable of setting up different shifted states as a function of different operating conditions in the direct gear:

for first operating conditions the control unit couples the countershaft to the power-conducting transmission shaft with a first transmission ratio in the direct gear. In this context, "power-conducting conditions" is understood to be transmission elements which are intermediately connected into the power flux between the transmission input shaft and transmission output shaft in the direct gear.

in contrast, if two operating conditions are present, the control unit automatically couples the countershaft to the power-conducting transmission shaft with a second transmission ratio in the direct gear. In this context the second transmission ratio is of different configuration from the first transmission ratio and is preferably brought about via different transmission elements such as gearwheel pairings, in particular via input constants.

As already mentioned previously it is possible in this way both to take into account a desired acceleration behavior of the motor vehicle and/or to allow, in good time, for a future gear shifting process from the direct gear into another transmission gear.

The process by means of the control unit may be carried out, in particular, according to the previously mentioned parameters which signal that it is advantageous to change the coupling of the countershaft to the power-conducting transmission shaft. Alternatively or additionally it is possible for the change to be carried out as a function of a predetermined value for a signal of a driver, for example a manual switch, the power adjustment parameters of the driver or the like.

According to one development of the method according to the invention, for a selected direct gear the control unit brings about an automatic change from the first transmission ratio to the second transmission ratio, in particular in accordance with the operating parameters.

Such an automatic change is advantageous, on the one hand, if as a result of a change in the operating conditions it becomes apparent that the second transmission ratio is advantageous with respect to a gear which is to be selected in future, for example if at least part of the power flux takes place in any case in this gear by means of the second transmission ratio. Such a future change can be predicted by means of predictor methods which are known per se.

A change from a first transmission ratio to a second transmission ratio can still be brought about in particular if, owing to the operating conditions present, the predictor method firstly assumes a necessary, future first transmission ratio and decides, owing to a change in the operating parameters, that a different gear change with a target gear is more probable, is advantageous for the second transmission ratio.

Alternatively it is possible to provide, on a standard basis, that at first the first transmission ratio is activated and the second transmission ratio is brought about by the control unit for selected operating conditions.

By means of a change in the transmission ratio between the power-conducting transmission shaft and the countershaft the kinetic energy of the countershaft, and of transmission elements rotating with it, changes, specifically becomes larger or smaller. This change in the energy level is extracted from the drive train or fed to it, this being expressed, on the one hand, by means of (slight) acceleration (increase or reduction in the speed) of the motor vehicle so that according to the invention it is possible to act on the movement of the motor vehicle. In this context the acceleration profile or such a "brake intervention" can be influenced by a suitable synchronization process during the change from the first transmission ratio to the second transmission ratio.

On the other hand, the rotational speed of the countershaft is adapted from the first transmission ratio to the second transmission ratio by means of the gear shifting elements to which forces or energy are applied in correlation with the change in energy which is brought about, it being possible for said adaptation to give rise to heating and/or wear of the gear shifting element. For a change from a predefined starting rotational speed of the countershaft to a target rotational speed of the countershaft it may be advantageous if the necessary change in energy is not brought about during a single gear shifting process but rather according to the invention is divided between two individual gear shifting processes. Accordingly, the starting rotational speed is firstly applied to an intermediate rotational speed within the scope of a first transmission ratio in order to be subsequently adjusted to the target rotational speed by means of the second transmission ratio which is automatically brought about. As a result of this the (positive or negative) acceleration of the motor vehicle can also be generated in two steps, under certain circumstances in a way which cannot be perceived so easily and/or over a relatively long time period. On the other hand, such a division of the application of energy results, under certain circumstances, in reduced loading of the gear shifting elements involved. This occurs in particular if different gear shifting elements are responsible for the first and second transmission ratios, with a result that the application of energy is divided between two gear shifting elements.

The operating conditions according to the invention which are responsible for a change from the first transmission ratio to the second transmission ratio (or vice versa) may be all the operating conditions which are taken into account in customary predictor methods, for example a position or a change in a power adjustment element (accelerator pedal, clutch pedal or a brake), an engine speed, an engine torque, an engine characteristic diagram, a power excess, a control time of an internal combustion engine, geodetic data, an air pressure, a temperature, information about the roadway (inclination of the carriageway, profile of a bend), information from a distance warning system or an accident early-detection means. In the simplest case the operating conditions are merely time periods, for example the time interval from a gear change, such as for example the time interval from the time when the direct gear is selected.

According to a further proposal of the invention it is possible, by means of the control unit, to decouple the transmission the countershaft from power-conducting transmission shafts in the direct gear in addition to a drive of the countershaft of a first transmission ratio and a second transmission ratio for third operating conditions which are present in the direct gear. In addition to the aforesaid advantages, according to the invention a particularly low-loss operating mode is thus possible for the third operating conditions and an operating mode which is, under certain circumstances, agile is possible since the inert mass of the countershaft does not play any role in the direct gear during acceleration processes and any frictional losses or churning losses of the countershaft do not adversely affect the efficiency of the transmission. Furthermore, rolling losses of gearwheels which are unnecessary under certain circumstances are avoided for the third operating conditions in the direct gear.

According to one development of the invention it is possible to make use of the fact that, under certain circumstances, when there is a change into the direct gear the countershaft has previously already been coupled to another transmission shaft by means of the first transmission ratio. In this case it is advantageous if for a change into the direct gear this existing connection by means of the first transmission ratio is firstly maintained for a change into the direct gear. If the control unit detects subsequently that the second or third operating conditions apply, the control unit automatically brings about the second transmission ratio between the countershaft and power-conducting transmission shaft or decouples the abovementioned shafts. This makes it possible to avoid unnecessary expenditure on shifting gears. For example, with such a configuration an unnecessary gear shifting process can be avoided if a gear is selected after the direct gear.

The first transmission ratio and the second transmission ratio may be transmission ratios between a transmission input shaft and the countershaft and/or transmission ratios between a transmission output shaft and the countershaft. When both input-end and output-end transmission ratios are used, the variety and gradation of the available transmission ratios can be increased in order to couple the movement of the power-conducting transmission shaft in the direct gear and the countershaft. Under certain circumstances this also makes it possible to use not only two but rather several different transmission ratios in the direct gear.

According to a further configuration of the invention, the first transmission ratio and the second transmission ratio are brought about by means of input constants of the transmission. These are particularly suitable for coupling the movement of the power-conducting transmission shaft and of the countershaft. A further advantage of a use of the input constants is that when an input constant is used for a drive of the transmission shaft when there is a change out of the direct gear, during which change the power flux runs from the transmission output shaft to the countershaft, into another gear in which the power flux runs from the transmission input shaft to the countershaft, there is no need to reverse the power flux to the transmission shaft. This is not the case for output-end transmission ratios.

According to a further proposal of the invention, a second input constant, with which the second transmission ratio is also formed, is involved in the transmission of power in a gear which is adjacent to the direct gear. The first input constant which is assigned to the first transmission ratio has, in accordance with this configuration, a higher or slower transmission ratio than the second input constant. This configuration of the invention is based on the recognition that a change from the direct gear to an adjacent gear takes place with a relatively high probability. By "intermediately connecting" the first input constant it is possible to perform the gradation, mentioned at the beginning, of the change in energy so that at first in the first transmission ratio the countershaft is adjusted to an intermediate rotational speed and then subsequently adjusted to the target rotational speed which correlates to the first transmission ratio, with the result that the countershaft already has the corresponding rotational speed for the adjacent gear.

According to one development of the method according to the invention, during the selection of the direct gear the countershaft is firstly decoupled from the power-conducting transmission shaft. Accordingly, a comparative state is established for the selected direct gear, which state is independent of the gear from which the direct gear has been selected. Furthermore, in this stage with a decoupled countershaft the operating mode has minimized loss and the drive train has low inertia for this mode. Gear shifting from the direct gear into another transmission gear in which the second input constant transmits power takes place incrementally: at first the first input constant is activated. As a result, the countershaft can be adjusted to the intermediate rotational speed. The second input constant is subsequently activated and the other transmission gear is moved into the power flux.

Such a configuration of the method according to the invention can particularly advantageously be combined with a predictor method which is known per se. If an approximate time for a gear change is known by means of such a predictor method, the aforesaid first stage can already take place when the first input constants are activated, before the time for the gear change is determined using the predictor method. The result of this is that the actual gear change can be brought about in a particularly fast and gentle fashion in the form of the aforesaid second stage. Furthermore, by suitably moving the time forward it is possible to extend a different operating phase, in particular the operating mode with decoupled countershaft, until before the time when the gear change is actually carried out, which provides advantages in terms of efficiency levels.

According to a further embodiment of the invention, there is a continuous connection in the direct gear between the power-conducting transmission shaft and the countershaft by means of the first transmission ratio if it is determined that the residence time in the direct gear is anticipated to be short. As a result, the countershaft runs with a reduced speed. For a gear shifting (down) process which actually takes place the expenditure on synchronization is reduced owing to the countershaft which is also moved. At the same time, owing to the reduced speed of the countershaft in the direct gear the power losses are reduced in comparison with a countershaft which is driven by means of the second transmission ratio.

This configuration thus constitutes a compromise in terms of minimizing the expenditure on synchronization and the synchronization time, on the one hand, and the power losses in the direct gear, on the other hand. The probable residence time can be determined in particular by means of a predictor method which has already been previously mentioned and/or, for example, by means of empirical values which have been acquired on the basis of the previous driving behavior or GPS data and road information.

A preferred exemplary embodiment of the device according to the invention will be explained in more detail below with reference to the accompanying drawings:

DESCRIPTION OF VARIOUS EMBODIMENTS

Figure 1:
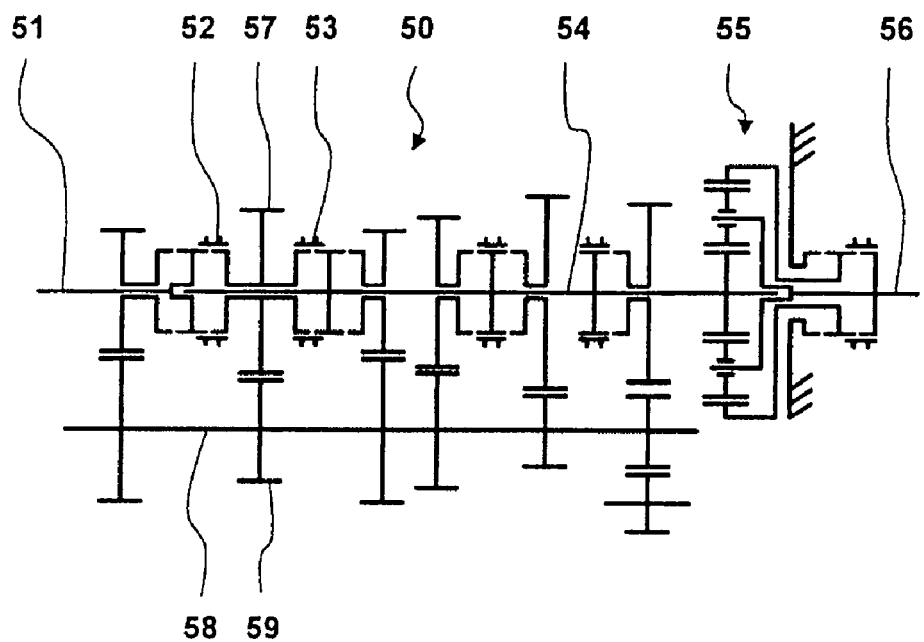
FIG. 1 shows a group transmission with a direct gear according to the prior art.

The transmission 50 illustrated in FIG. 1 is a conventional group transmission with a component transmission of a reduction gearing design and with a direct gear. In the activated direct gear illustrated in FIG. 1, the drive torque is transmitted from an input shaft 51 via a gear shifting element 52 and a gear shifting element 53 which is connected to the gear shifting element 52 so as to rotate with it, to a main shaft 54 which is connected to the output shaft 56 via the planetary gear set 55 which rotates in the direct gear in the block. A gearwheel 57, which intermeshes with a gearwheel 59 which is connected to the countershaft 58 so as to rotate with it is connected to the gear shifting elements 52, 53 so as to rotate with them, with the result that in the direct gear the countershaft 58 is also rotated by the input shaft 51. According to FIG. 1, the gear shifting element 52 does not transmit any drive torque in the neutral position, while the drive movement is transmitted from the input shaft 51 to the countershaft 58 for both active shifted positions.

Figure 2:
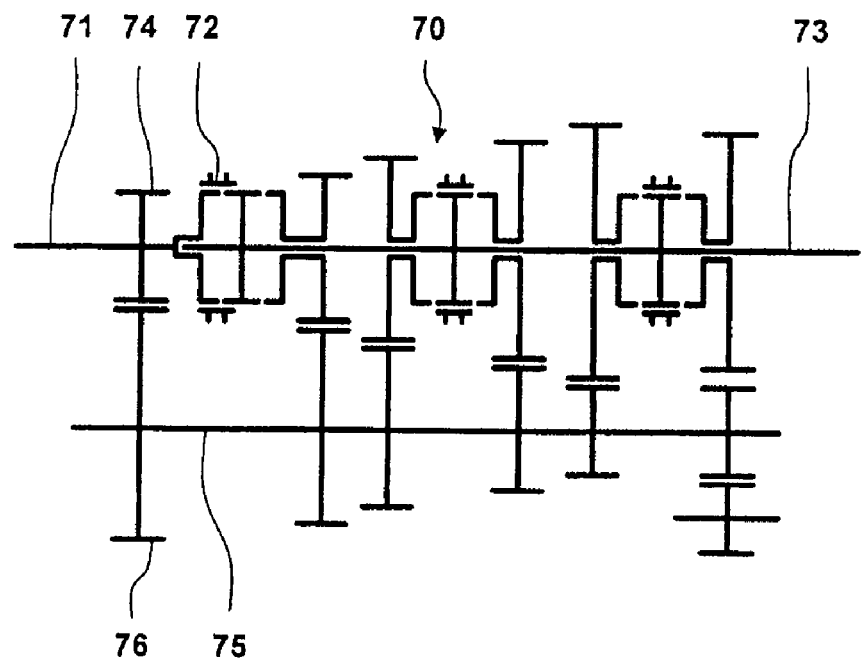
FIG. 2 shows a transmission of a reduction gearing design with a direct gear according to the prior art.

FIG. 2 shows a conventional fifth gear transmission 70 of a reduction gearing design and with a direct gear. From the input shaft 71, the drive torque is transmitted, as illustrated, via a gear shifting element 72 to the output shaft 73 in the direct gear. In this case, the input shaft 71 is continuously connected to a gearwheel 74 so as to rotate with it, said gearwheel 74 forcibly intermeshing with a gearwheel 76 which is connected in a rotatable and non-releasable fashion to the countershaft 75.

Figure 3:
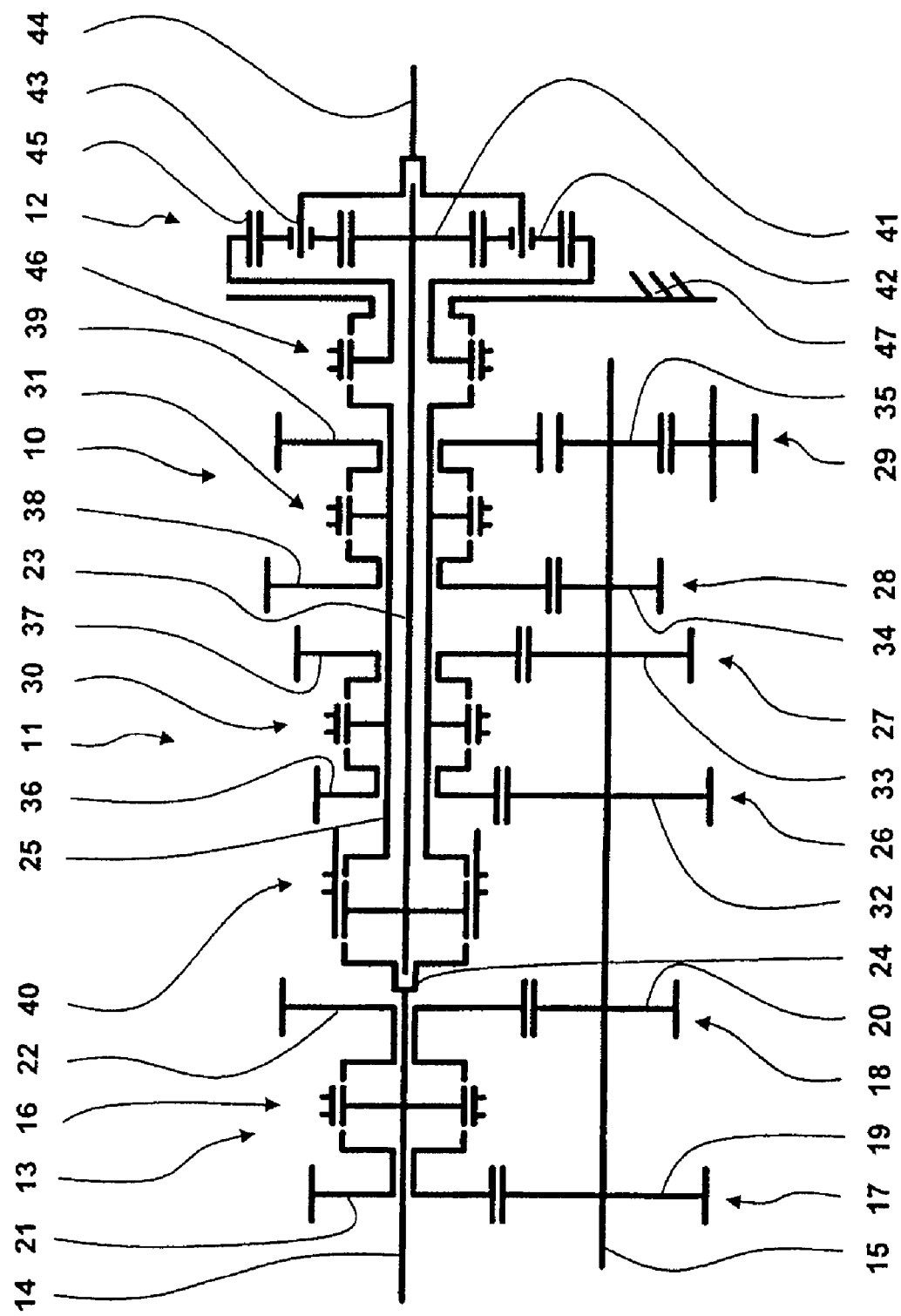
FIG. 3 shows a wheel diagram of an embodiment of a vehicle transmission according to the invention.

FIG. 3 shows a vehicle transmission 10 with a first component transmission 11 and a further component transmission 12. The first component transmission 11 is of a reduction gearing design while the further component transmission 12 is embodied as a variable-ratio gear unit or planetary gear set.

The first component transmission 11 contains a split transmission 13 so that overall there is a 3-group transmission. In the split transmission 13, a drive movement is transmitted from a transmission input shaft 14 to a countershaft 15, with the transmission taking place alternatively via a first gearwheel pair 17 (first input constant) or a second gearwheel pair 18 (second input constant) depending on the shifted state of a gear shifting element 16. The output gearwheels 19, 20 of the gearwheel pairs 17, 18 are connected to the countershaft 15 so as to rotate with it, while the drive gearwheels 21, 22 of the gearwheel pairs 17, 18 can each be individually connected via the gear shifting element 16 to the transmission input shaft 14 so as to rotate with it.

Furthermore, the first component transmission 11 has, on the side of the split transmission 13 facing away from the transmission input shaft 14, a main shaft 23 which is mounted in a bearing 24 so as to be rotatable with respect to the transmission input shaft 14. The transmission input shaft 14 and the main shaft 23 are arranged aligned with one another. The countershaft 15 extends parallel to the main shaft. An output shaft 25 of the first component transmission is arranged coaxially with respect to the main shaft 23, is embodied as a hollow shaft and receives the main shaft 23 lying radially on the inside or is mounted with respect to it. The countershaft 15 and the hollow shaft 25 can be placed in a drive connection with one another by means of gearwheel pairs 26, 27, 28 and a reverse gear 29 by means of gear shifting elements 30 and 31.

The drive gearwheels 32, 33, 34, 35 of the gearwheel pairs 26 to 28 and the reverse gear 29 are connected to the countershaft 15 so as to rotate with it. The output gearwheels 36, 37 of the gearwheel pairs 26, 27 can each be connected individually to the output shaft 25 by means of the gear shifting element 30, while the output gearwheels 38, 39 of the gearwheel pair 28 and of the reverse gear 29 can each be connected individually to the output shaft 25 by means of the gear shifting element 31.

In a shifted state 16-I the gear shifting element 16 connects the drive gearwheel 21 to the transmission input shaft 14. In the neutral state 16-II illustrated in FIG. 3, the gear shifting element 16 is without effect so that the drive gearwheels 21, 22 can each rotate freely in relation to one another and with respect to the transmission input shaft 14. In a shifted state 16-III, the gear shifting element 16 connects the drive gearwheel 22 to the transmission input shaft 14.

In a shifted state 30-I, the gear shifting element 30 connects the output gearwheel 36 to the output shaft 25. In the shifted state 30-II outlined in FIG. 3, the gear shifting element 30 is without effect so that the output gearwheels 36, 37 can rotate freely in relation to one another and with respect to the output shaft 25. In a shifted state 30-III, the output shaft 25 is connected by means of the gear shifting element 30 to the output gearwheel 37 so as to rotate with it.

In a shifted state 31-I, the gear shifting element 31 connects the output gearwheel 38 to the output shaft 25 so as to rotate with it. In the shifted state 31-II illustrated in FIG. 3 the gear shifting element 31 is without effect so that the output gearwheels 38, 39 can rotate in relation to one another and with respect to the output shaft 25. In a shifted state 31-III, the gear shifting element 31 connects the output gearwheel 39 to the output shaft 25 so as to rotate with it.

In a shifted state 40-I, the transmission input shaft 14 is connected by means of a gear shifting element 40 to the main shaft 23 so as to rotate with it, while the output shaft 25 can rotate with respect to the latter. In a shifted state 40-II, the transmission input shaft 14, the main shaft 23 and the output shaft 25 are connected to one another so as to rotate with one another. In the shifted state 40-III illustrated in FIG. 3, the main shaft 23 and the output shaft 25 are connected to one another so as to rotate with one another, while the transmission input shaft 14 can rotate with respect to them.

On the side of the first component transmission 11 facing away from the split transmission 13, the output shaft 25 and the main shaft 23 project out of it.

The further component transmission 12 has a sun wheel 41 which is connected to the main shaft 23 so as to rotate with it, a plurality of planet wheels 42 which are mounted so as to be rotatable with respect to a web 43 which is connected to the transmission output shaft 44 so as to rotate with it, and an internal gearwheel 45.

In a shifted state 46-I, the output shaft 25 is connected by means of a gear shifting element 46 to the internal gearwheel 45 so as to rotate with it. In a shifted state 46-II, the gear shifting element 46 is in a neutral state for which the output shaft 25 and the internal gearwheel 45 are not coupled to one another by means of the gear shifting element 46. In a shifted state 46-III, the shifting element 46 connects the internal gearwheel 45 to a housing 47 so as to lock it.

In FIGS. 4 to 16, the power flux in the transmission is respectively marked with a thick line for the individual gears.

Figure 4:
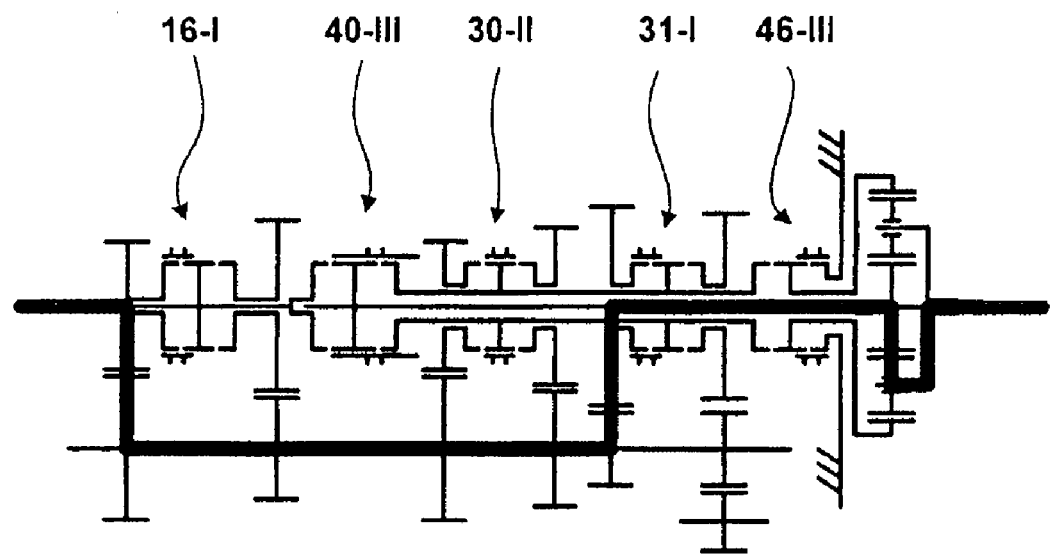
FIG. 4 shows the vehicle transmission according to FIG. 3 for a first gear.

In the first gear illustrated in FIG. 4, a power flux occurs from the transmission input shaft 14 via the shaft 23 to the sun wheel 41 via the gear shifting element 16 in the shifted state 16-I, via the gearwheel pair 17, countershaft 15, gearwheel pair 28 and gear shifting element 31 in the shifted state 31-I, and via the output shaft 25 and gear shifting element 40 in the shifted state 40-III. In the further component transmission 12, the internal gearwheel is braked with respect to the housing 47 in the shifted state 46-III by means of the gear shifting element 46. The gear shifting element 30 is in the neutral state 30-II.

Figure 5:
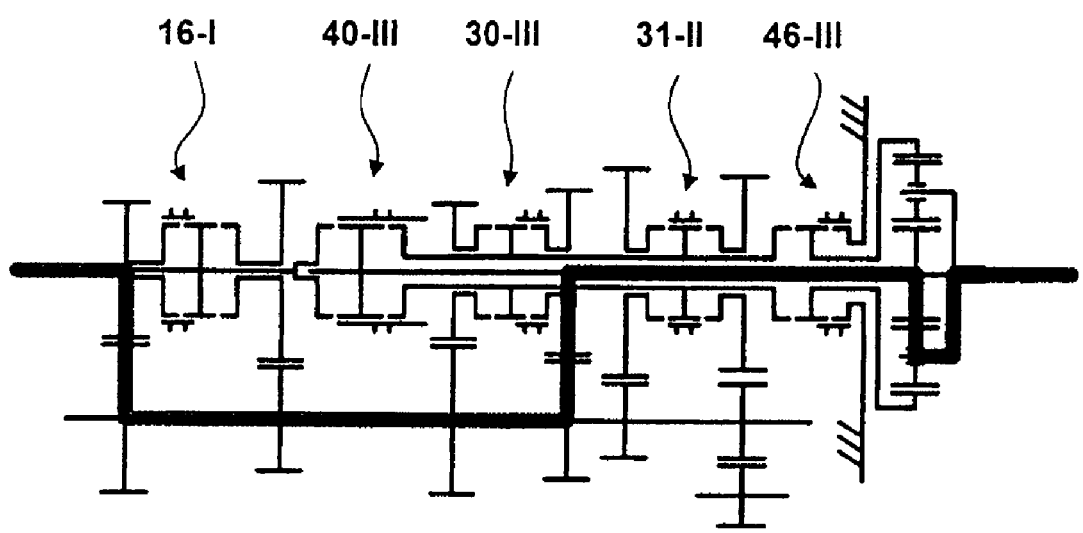
FIG. 5 shows the vehicle transmission according to FIG. 3 for a second gear.

In the second gear illustrated in FIG. 5, the drive movement is transmitted from the transmission input shaft 14 via the main shaft 23 to the sun wheel 41 via the gear shifting element 16 in the shifted state 16-I, via the gearwheel pair 17, countershaft 15, gearwheel pair 27 and gear shifting element 30 in the shifted state 30-III, and via the output shaft 25 and gear shifting element 40 in the shifted state 40-III, with the internal gearwheel 45 being braked with respect to the housing 47 for the further component transmission 12 by means of the gear shifting element 46 in the shifted state 46-III. The gear shifting element 31 is in the neutral state 31-II.

Figure 6:
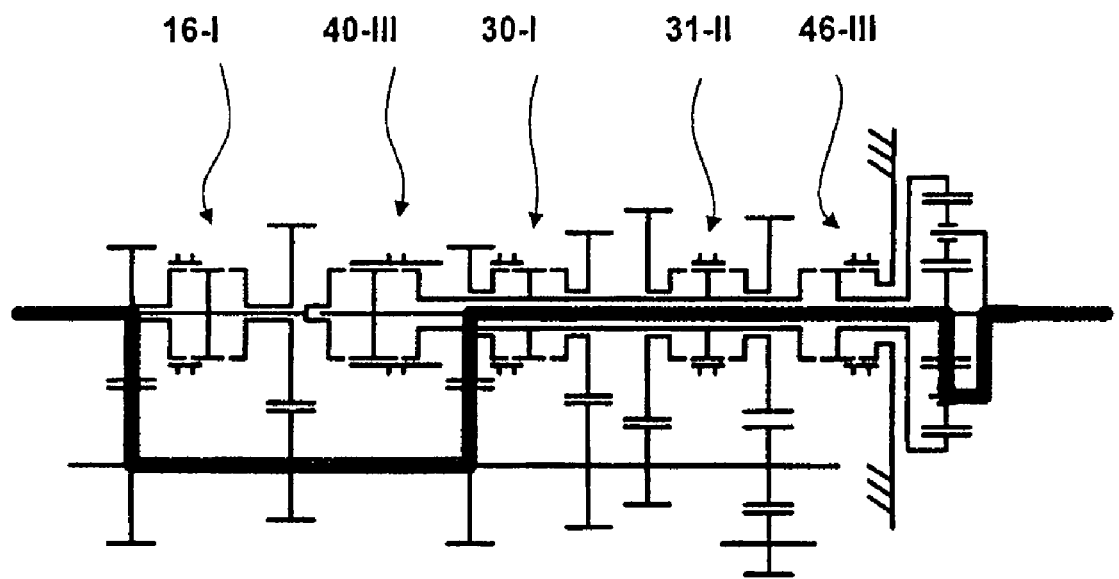
FIG. 6 shows the vehicle transmission according to FIG. 3 for a third gear.

For the third gear illustrated in FIG. 6, the drive movement of the transmission input shaft 14 is transmitted via the main shaft 23 to the su wheel 41, via the gear shifting element 16 in the shifted state 16-I, via the gearwheel pair 17, countershaft 15, gearwheel pair 26 and gear shifting element 30 in the shifted state 30-I, via the output shaft 25 and gear shifting element 40 in the shifted state 40-III, with the internal gearwheel 45 of the further component transmission 12 being braked with respect to the housing 47 by means of the gear shifting element 46 in the shifted state 46-III. The gear shifting element 31 is in the neutral state 31-II.

Figure 7:
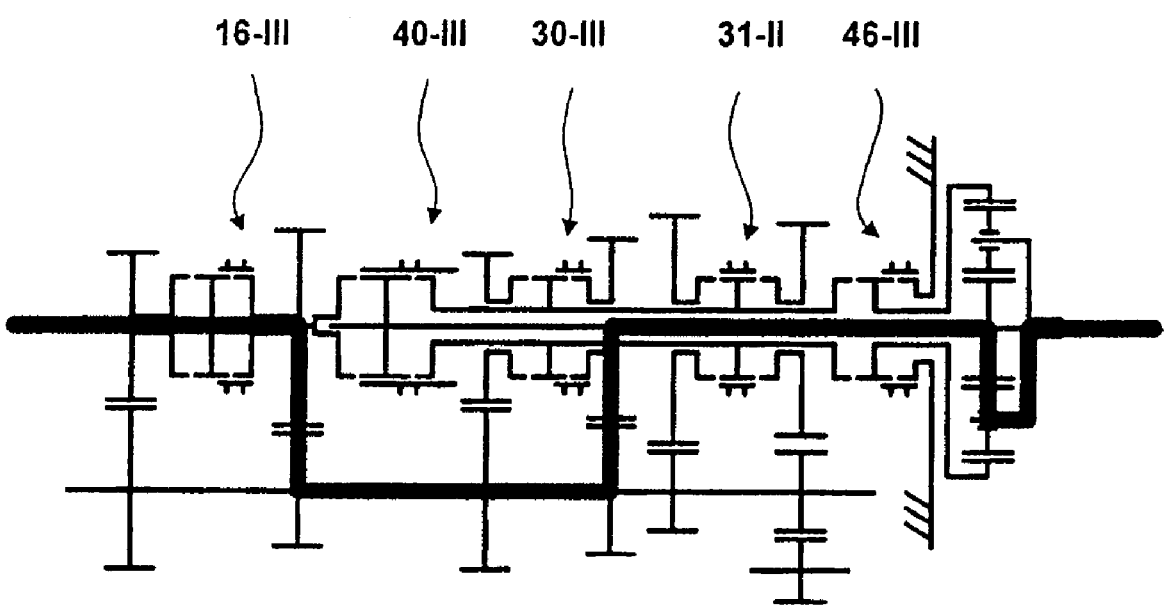
FIG. 7 shows the vehicle transmission according to FIG. 3 for a fourth gear.

In the fourth gear illustrated in FIG. 7, the drive movement is transmitted from the transmission input shaft 14 via the main shaft 23 to the sun wheel 41, via the gear shifting element 16 in the shifted state 16-III, via the gearwheel pair 18, the countershaft 15, the gearwheel pair 27 and the gear shifting element 30 in the shifted state 30-III, and via the output shaft 25 and gear shifting element 40 in the shifted state 40-III, with the internal gearwheel 45 of the further component transmission 12 being braked tight with respect to the housing 47 by means of the gear shifting element 46 in the shifted state 46-III. The gear shifting element 31 is in the neutral state 31-II.

Figure 8:
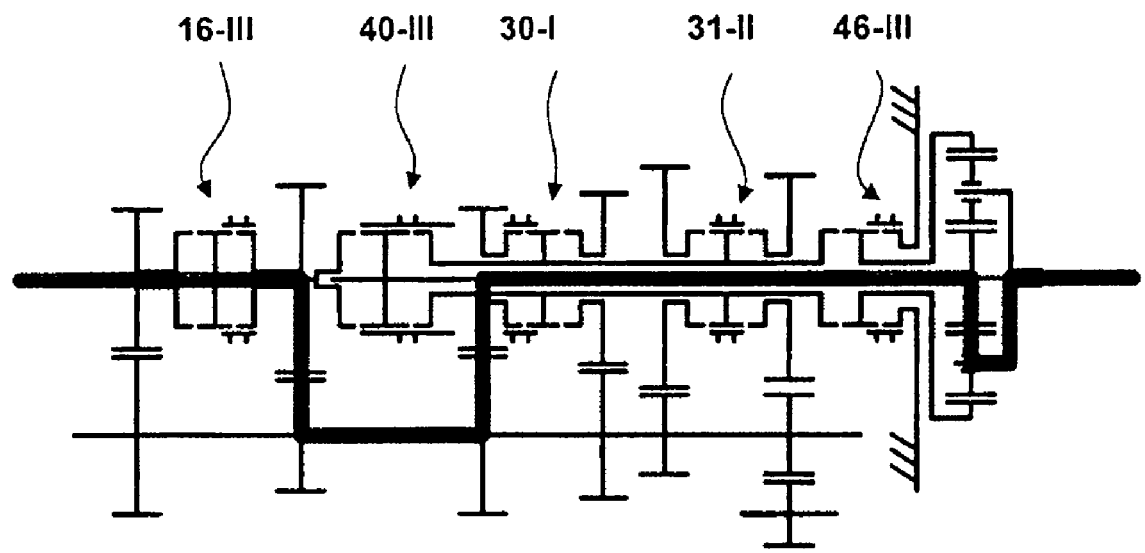
FIG. 8 shows the vehicle transmission according to FIG. 3 for a fifth gear.

In the gear illustrated in FIG. 8, the drive movement is transmitted from the transmission input shaft 14 via the main shaft 23 to the sun wheel 41, via the gear shifting element 16 in the shifted state 16-III, the gearwheel pair 18, countershaft 15, gearwheel pair 26 and gear shifting element 30 in the shifted state 30-I, and via the output shaft 25 and gear shifting element 40 in the shifted state 40-III, with the internal gearwheel 45 being braked tight with respect to the housing by means of the gear shifting element 46 in the shifted state 46-III. The gear shifting element 31 is in the neutral state 31-II.

Figure 9:
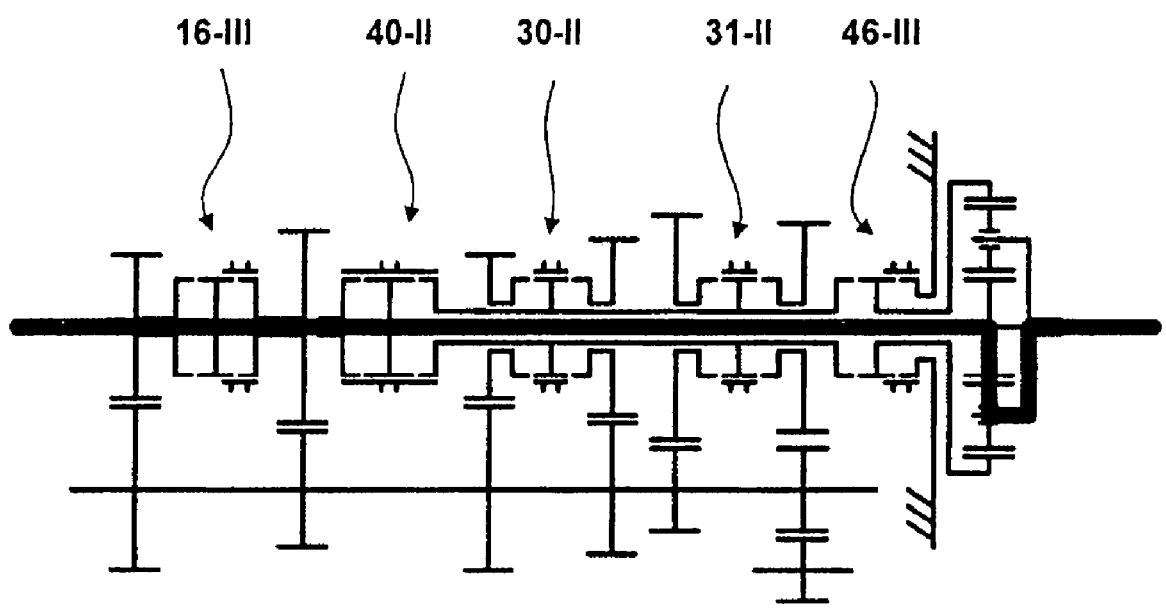
FIG. 9 shows the vehicle transmission according to FIG. 3 for a sixth gear.

In the sixth gear illustrated in FIG. 9, the drive movement is transmitted from the transmission input shaft 14 via the main shaft 23 to the sun wheel 41 via the gear shifting element 40 in the shifted state 40-II, with the internal gearwheel 45 being braked tight with respect to the housing 47 by means of the gear shifting element 46 in the shifted state 46-III. The further gear shifting elements are preferably in the shifted states 16-III, 30-II, 31-II.

Figure 10:
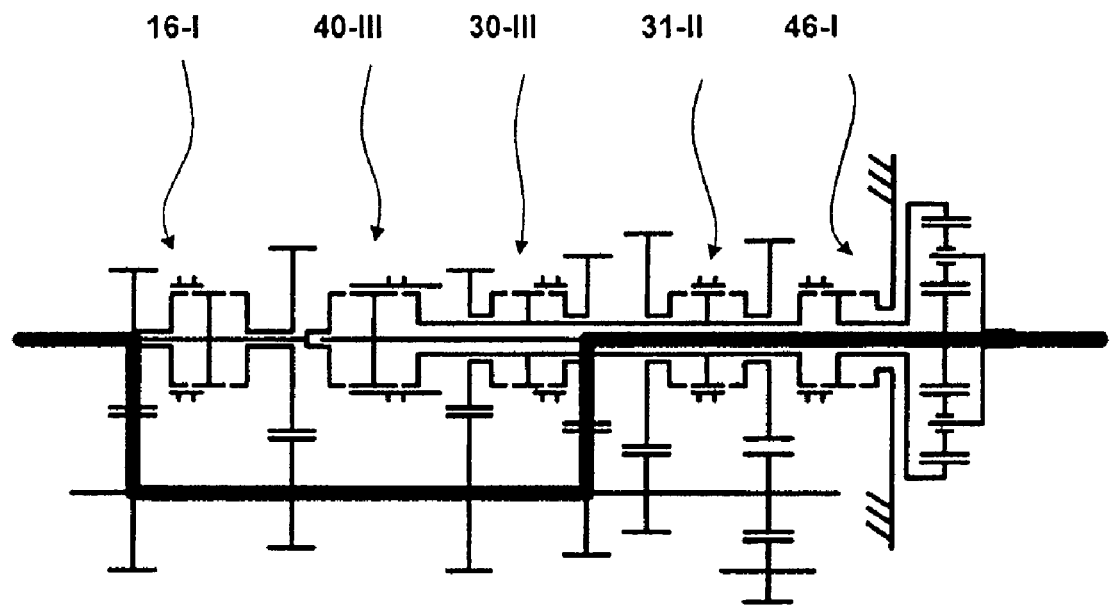
FIG. 10 shows the vehicle transmission according to FIG. 3 for a seventh gear.

For the seventh gear illustrated in FIG. 10, a power flux occurs from the transmission input shaft 14 via the main shaft 23 to the sun wheel 41, via the gear shifting element 16 in the shifted state 16-I, the gearwheel pair 17, the countershaft 15, the gearwheel pair 27 and the gear shifting element 30 in the shifted state 30-III, and via the output shaft 25 and gear shifting element 40 in the shifted state 40-III. The internal gearwheel 45 is connected to the output shaft 25 so as to rotate with it by means of the gear shifting element 46 in the shifted state 46-I so that the variable-ratio gear unit rotates in the block. The gear shifting element 31 is in the neutral state 31-II.

Figure 11:
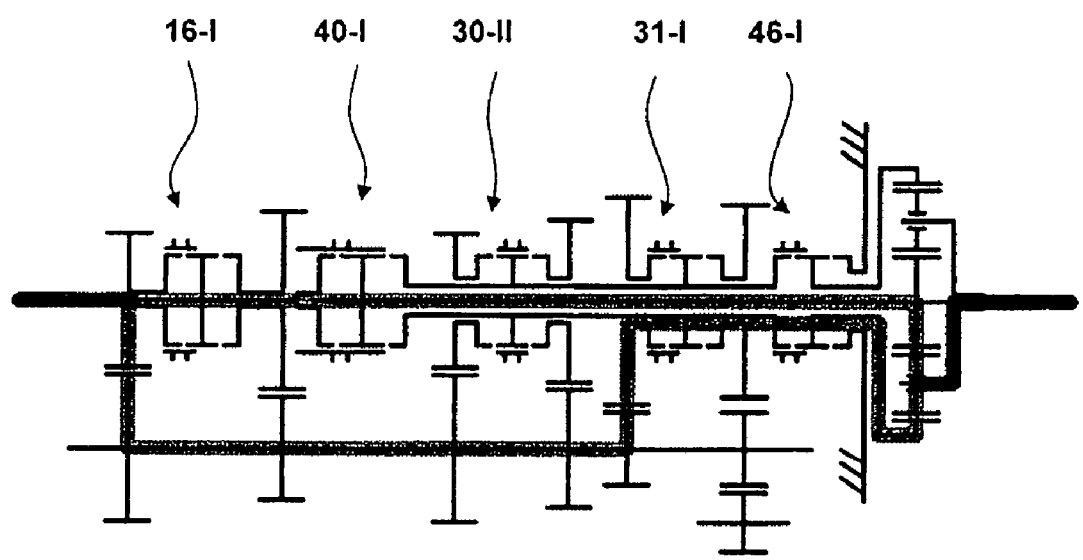
FIG. 11 shows the vehicle transmission according to FIG. 3 for an eighth gear.

For the eighth gear illustrated in FIG. 11, power branching takes place by means of the gear shifting element 16 which is coupled to the transmission input shaft 14. In a first power path the drive movement is transmitted to the internal gearwheel 45 via the gear shifting element 16 in the shifted state 16-I, the gearwheel pair 17, countershaft 15, gearwheel pair 28 and gear shifting element 31 in the shifted state 31-I and via the output shaft 25 and gear shifting element 46 in the shifted state 46-I, while in the other power path the drive movement is transmitted from the transmission input shaft 14 via the main shaft 23 to the sun wheel 41 via the gear shifting element 40 in the shifted state 40-I. By means of the transmission of the drive movements of the two power paths via the sun wheel 41 and internal gearwheel 45 a superimposition is carried out by means of the planet wheels 42 with respect to the output via the web 43 and transmission output shaft 44. The gear shifting element 30 is in the neutral state 30-II.

Figure 12:
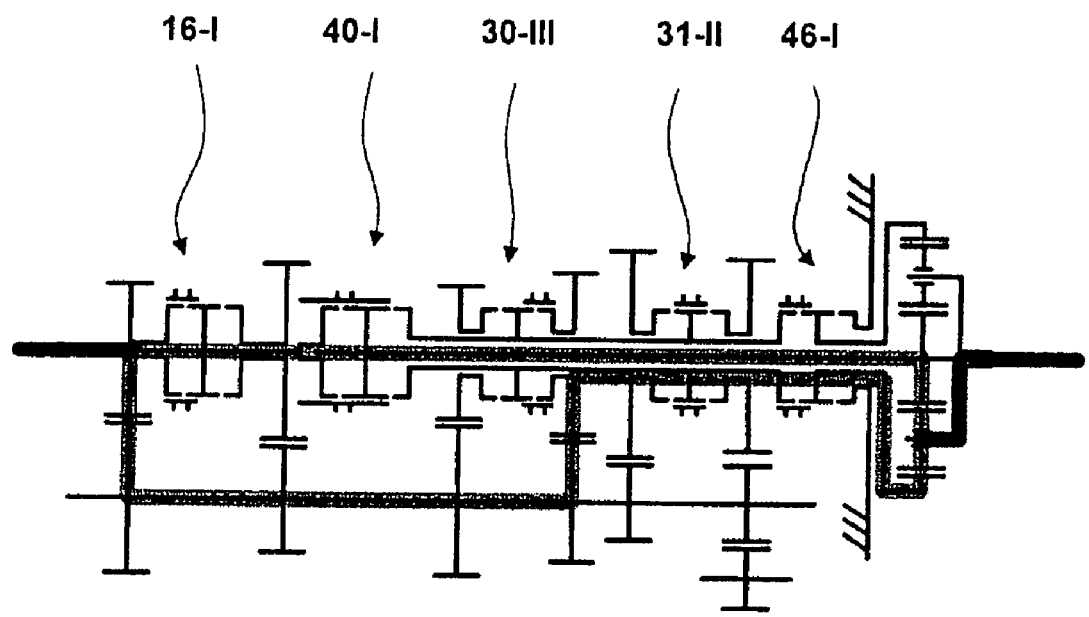
FIG. 12 shows the vehicle transmission according to FIG. 3 for a ninth gear.

For the ninth gear illustrated in FIG. 12, power branching takes place in the region of the gear shifting element 16. In a first power path, the drive movement is transmitted from the transmission input shaft 14 to the internal gearwheel 45 via the gear shifting element 16 in the shifted state 16-I, via the gearwheel pair 17, countershaft 15, gearwheel pair 27 and the gear shifting element 30 in the shifted state 30-III, and via the output shaft 25 and gear shifting element 46 in the shifted state 46-I, while in a second power path the drive movement of the transmission input shaft 14 is transmitted via the main shaft 23 to the sun wheel 41 via the gear shifting element 40 in the shifted state 40-I. In the further component transmission 12, the planet wheels 42 superimpose the drive movements of the power paths of the sun wheel 41 and the internal gearwheel 45 on the output movement of the webs 43 and of the transmission output shaft 44. The gear shifting element 31 is in the shifted state 31-II.

Figure 13:
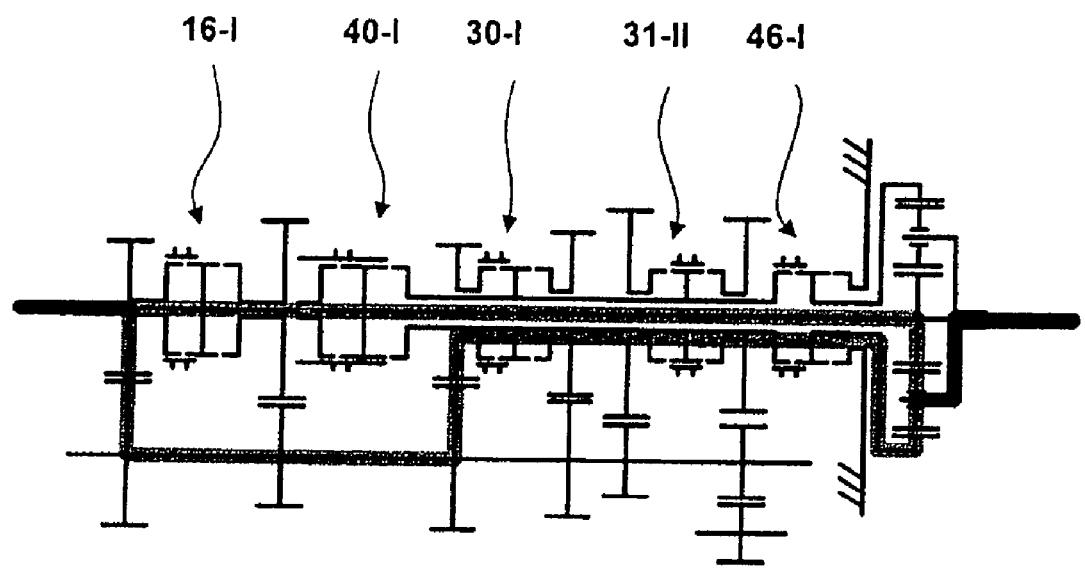
FIG. 13 shows the vehicle transmission according to FIG. 3 for a tenth gear.

For the tenth gear illustrated in FIG. 13, power branching takes place into two power paths in the region of the gear shifting element 16. From the transmission input shaft 14, the drive movement is transmitted in a first power path to the internal gearwheel 45 via the gear shifting element 16 in the shifted state 16-I, the gearwheel pair 17, transmission shaft 15, gearwheel pair 26 and gear shifting element 30 in the shifted state 30-I and the output shaft 25 and gear shifting element 46 in the shifted state 46-I, while in the second power path the drive movement is transmitted from the transmission input shaft 14 via the main shaft 23 to the sun wheel 41 via the gear shifting element 40 in the shifted state 40-I. In the further component transmission 12, the planet wheels 42 superimpose the drive movements of the power paths, of the sun wheel 41 and of the internal gearwheel 45 on the web 43 and the transmission output shaft 44. The gear shifting element 31 is in the neutral state 31-II.

Figure 14:
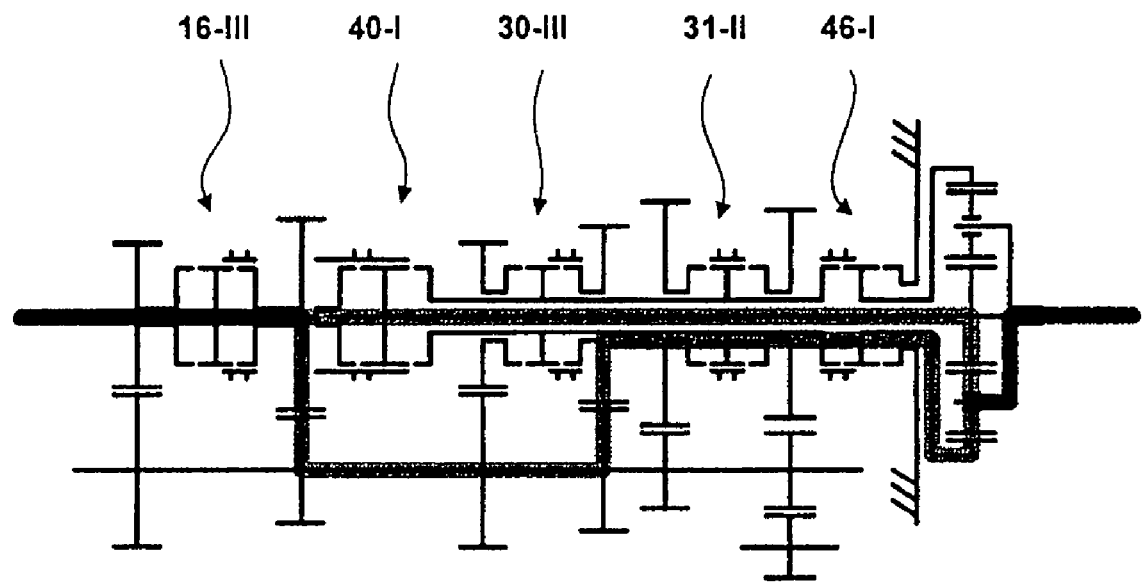
FIG. 14 shows the vehicle transmission according to FIG. 3 for an eleventh gear.

For the eleventh gear illustrated in FIG. 14, the drive movement is transmitted with power branching in the region of the gear shifting element 16. In a first power path, the drive movement is transmitted from the transmission input shaft 14 to the internal gearwheel 45 via the gear shifting element 16 in the shifted state 16-III, the gearwheel pair 18, countershaft 15, gearwheel pair 27 and gear shifting element 30 in the shifted state 30-III and via the output shaft 25 and gear shifting element 46 in the shifted state 46-I, while in the second power path the drive movement is transmitted from the transmission input shaft 14 via the main shaft 23 to the sun wheel 41 via the gear shifting elements 40 in the shifted state 40-I. In the further component transmission 12, the planet wheels 42 superimpose the drive movements of the power paths of the internal gearwheel 45 and of the sun wheel 41 on the webs 43 and the transmission output shaft 44. The gear shifting element 31 is in the neutral state 31-II.

Figure 15:
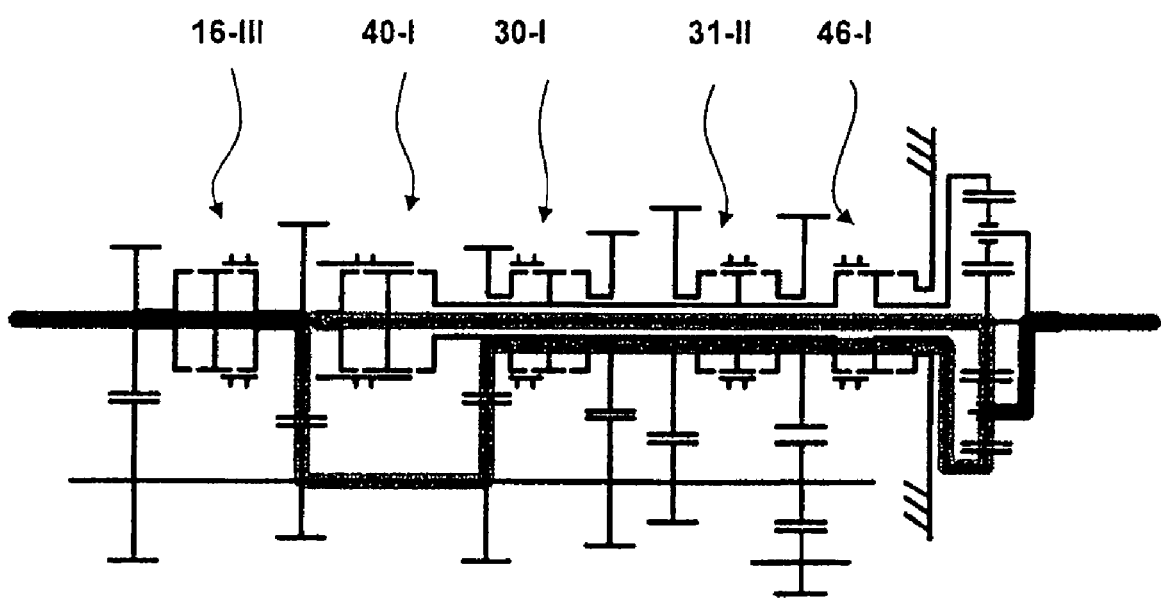
FIG. 15 shows the vehicle transmission according to FIG. 3 for a twelfth gear.

For the twelfth transmission stage illustrated in FIG. 15, power branching takes place in the region of the gear shifting element 16. In the first power path, the drive movement is transmitted from the transmission input shaft 14 to the internal gearwheel 45 via the gear shifting element 16 in the shifted state 16-III, via the gearwheel pair 18, countershaft 15, gearwheel pair 26 and gear shifting element 30 in the shifted state 30-I and via the output shaft 25 and gear shifting element 26 in the shifted state 46-I, while in the second power path the drive movement is transmitted from the transmission input shaft 14 via the main shaft 23 to the sun wheel 41 via the gear shifting element 40 in the shifted state 40-I. In the further component transmission 12, the planet wheels 42 superimpose the drive movements of the two power paths and thus of the internal gearwheel 45 and of the sun wheel 41 the webs 43 and the transmission output shaft 44. The gear shifting element 31 is in the shifted state 31-II.

Figure 16:
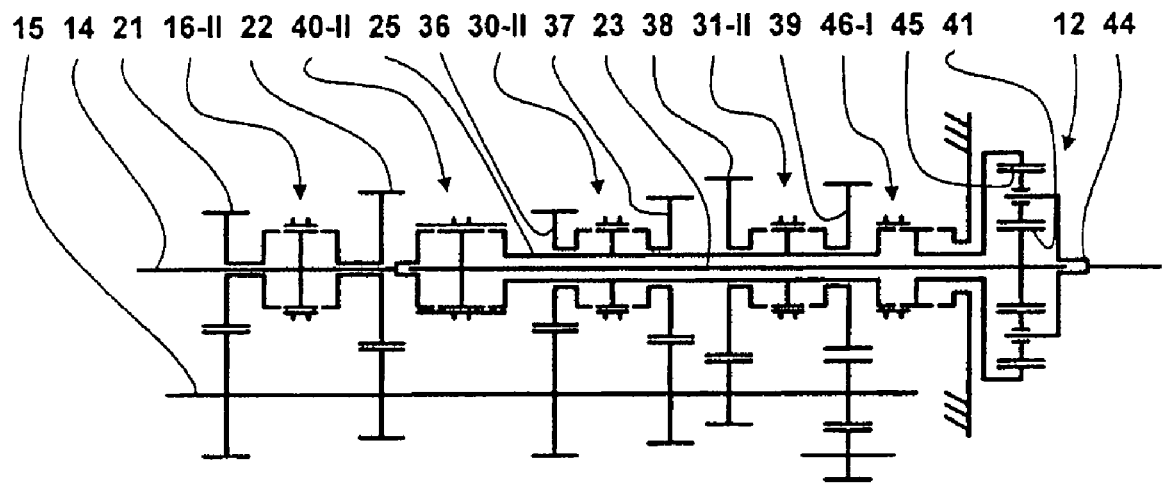
FIG. 16 shows the vehicle transmission according to FIG. 3 for a thirteenth gear.
Figure 17:
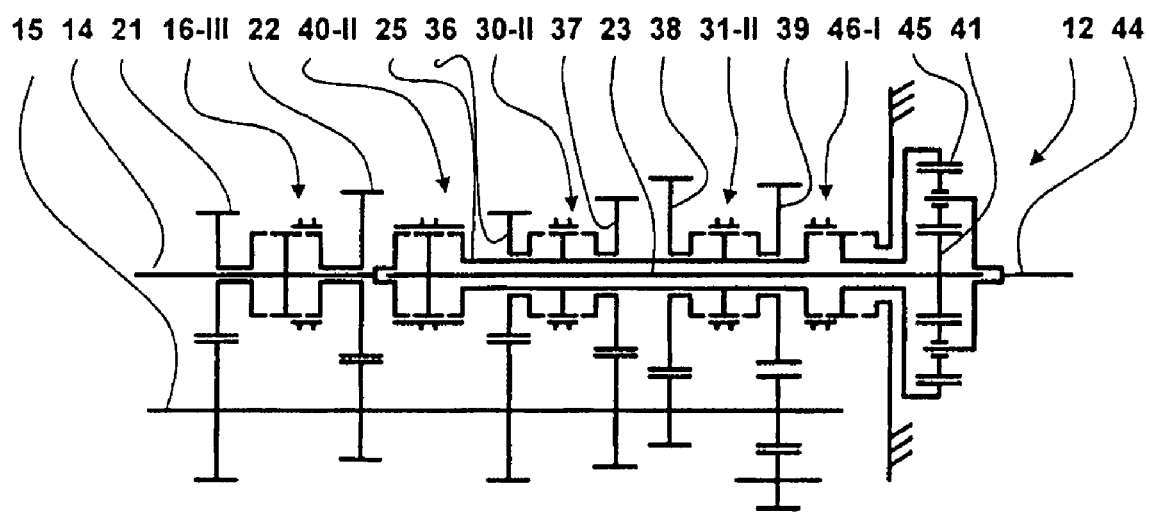
FIG. 17 shows the vehicle transmission according to FIG. 3 for a thirteenth gear in a shifted state which is varied in comparison with FIG. 16.
Figure 18:
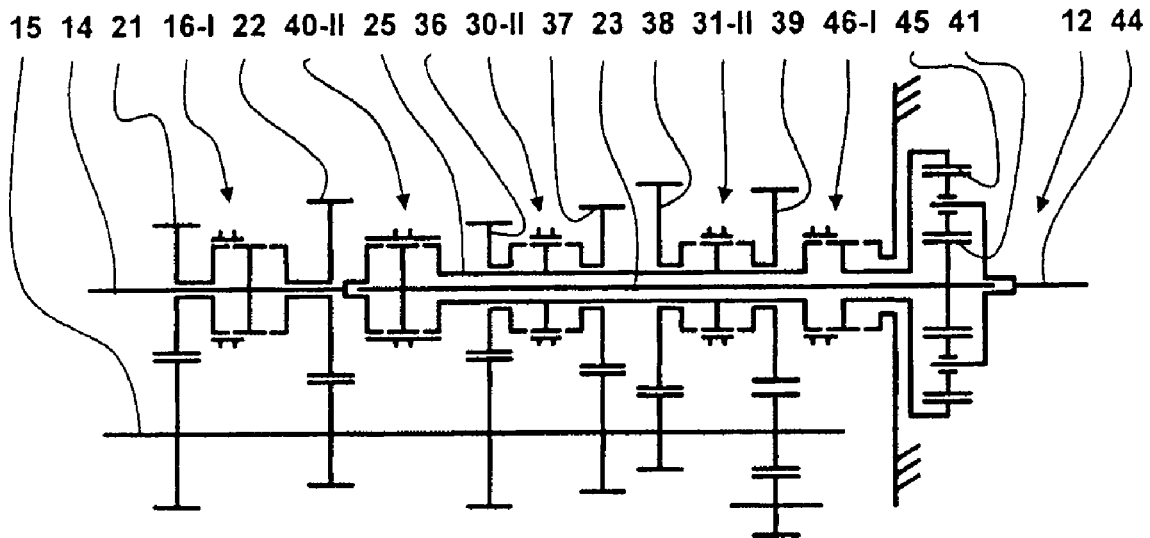
FIG. 18 shows the vehicle transmission according to FIG. 3 for a thirteenth gear in a shifted state which is varied in comparison with FIG. 16 and FIG. 17.

A thirteenth gear, which is illustrated for alternative configurations of the shifted states of the same transmission in FIGS. 16 to 18 is a direct gear in which the drive movement is transmitted to the main shaft 23 and to the output shaft 25 in shifted state 40-II without the intermediate connection of intermeshing gearwheel pairings of the input shaft 14 via the gear shifting element 40. In the shifted state 46-I of the gear shifting element 46, the internal gearwheel 45 is coupled to the input shaft 14 and to the main shaft 23, and thus to the sun wheel 41, via the output shaft 25 and the gear shifting element 40 in the shifted state 40-II, so that the further component transmission 12 rotates as a block. The rotational speed of the output shaft 44 corresponds to the rotational speed of the main shaft 23 and thus of the input shaft 14.

According to FIG. 16, the gear shifting element 16 is in the shifted position 16-II so that in the illustrated direct gear the drive gearwheels 21, 22 are not coupled to the input shaft 14. Accordingly, the drive movement is not transmitted from the input shaft 14 to the countershaft 15.

Correspondingly, the gear shifting elements 30, 31 are in the neutral positions 30-II and 31-II so that the output gearwheels 36, 37, 38, 39 are also decoupled from the main shaft 25 and thus from the output shaft 44.

The coupling of the countershaft in the direct gear, for example in conjunction with an intended change of gear or in order to initiate a braking process, can take place at the input end by moving the gear shifting element 16 into the shifted position 16-III according to FIG. 17 or into the shifted position 16-I according to FIG. 18. Alternatively, the countershaft can be coupled at the output end to the drive train in the direct gear by moving the gear shifting element 30 into the shifted position 30-I or 30-III or else the gear shifting element 31 into the shifted position 31-I or 31-III. In this context, a selection is made of the gear shifting element 16, 30, 31 to be shifted and of the selected shifted position in accordance with a desired transmission ratio in the direction of the transmission shaft and/or with respect to an expected gear which is expected when there is a change from the illustrated gear.

The respective transmission ratios for the gears 1 to 13 together with the step jumps resulting between adjacent gears, a power component of the running gears involved and an estimated advantage in terms of efficiency level with respect to a conventional transmission are illustrated in table 1. In the gears 8 to 12 with power branching, the running gears have only 37% to 67% of the transmission input power applied to them depending on the transmission ratio so that increased torques can be transmitted or else the running power can be increased. The transmitted torque can, according to the invention, be reduced in these gears with power branching by approximately 27% with respect to conventional transmissions with the same transmission ratios. Gears with power branching have an advantage over conventional transmissions in terms of the efficiency level of the toothing of approximately 0.5%. Since the planetary gear set (further component transmission 12) is blocked by means of the sun wheel 41 and the internal gearwheel 45, no reactive torques occur as with a conventional design.

TABLE 1

| Gear-speed | Transmission ratio | Step jump | Power component Running gears | Estimated advantage in efficiency level over conventional transmissions |
|---|---|---|---|---|
| 1 | 17.11 | 1.61 | 100% | — |
| 2 | 10.65 | 1.31 | 100% | — |
| 3 | 8.13 | 1.30 | 100% | — |
| 4 | 6.23 | 1.31 | 100% | — |
| 5 | 4.76 | 1.29 | 100% | — |
| 6 | 3.70 | 1.29 | 0% | — |
| 7 | 2.88 | 1.23 | 100% | — |
| 8 | 2.34 | 1.22 | 37% | 0.4% |
| 9 | 1.91 | 1.15 | 48% | 0.4% |
| 10 | 1.66 | 1.17 | 55% | 0.5% |
| 11 | 1.42 | 1.19 | 62% | 0.5% |
| 12 | 1.19 | 1.19 | 68% | 0.5% |
| 13 | 1.00 | | 0% | 1.0% |

FIG. 3 shows in which gearwheel pairings a speed transformation or speed reduction takes place, on the basis of the illustrated size ratios of the gearwheels. By determining the size ratios of the gearwheels it is also possible to derive exemplary configurations for gearwheel diameters and transmission ratios to be selected. Deviations from the illustrated ratios and the specified overall transmission ratios and step jumps are possible depending on the design of the vehicle transmission.

The first input constant 17 is made shorter or slower than the second input constant 18.

In the method according to the invention, a control unit 60 suitably actuates the gear shifting elements 16, 40, 37, 31. For example, a gear change from the twelfth transmission stage into the thirteenth gear, that is to say the direct gear, takes place. In this context it is possible to leave the gear shifting element 16 in the shifted position 16-III for the change. Alternatively the gear shifting element 16 can be moved into the shifted position 16-II so that the countershaft 15 is decoupled from the transmission input shaft 14 and thus from the transmission elements which carry power in the direct gear.

For a shift down out of the direct gear into the twelfth transmission stage the control unit firstly activates the gear shifting element 16 in the direction of the shifted position 16-I. In this context, the countershaft is synchronized with the transmission input shaft 14 to an intermediate rotational speed which results from the rotational speed of the transmission input shaft 14 and the transmission ratio of the first input stage 17.

Subsequently the control unit transfers the gear shifting element 16 into the shifted position 16-III, with the countershaft 15 being adjusted in the shifted position 16-I from the intermediate rotational speed to the target rotational speed which results from a rotational speed of the transmission input shaft 14 and the transmission ratio of the second input constants 18. The target rotational speed corresponds to the rotational speed of the countershaft in the twelfth transmission stage. Synchronization can be carried out herein by changing the drive movement of the drive assembly, intervention in the output movement or acceleration of the countershaft 15, which is brought about by means of synchronization devices of the gear shifting element 16 and/or acceleration devices of the countershaft 15.

Figure 19:
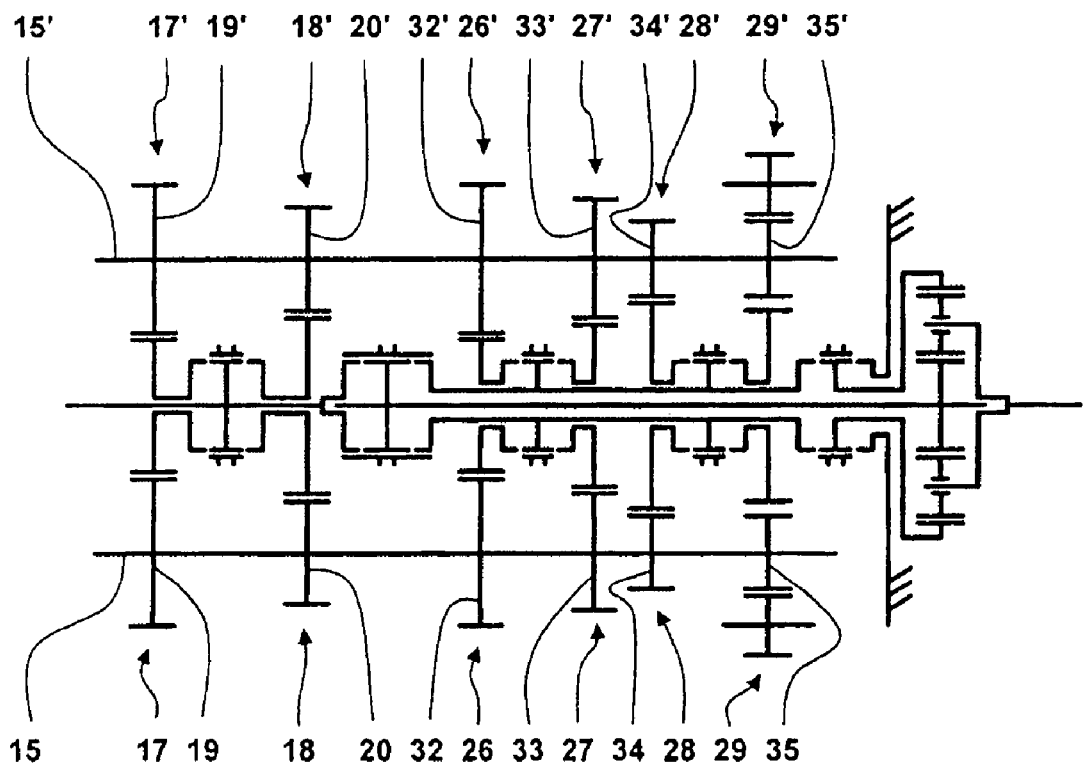
FIG. 19 shows an alternative exemplary embodiment of a transmission according to the invention which can be operated with a method according to the invention, with two countershafts ("neutral" gear position)

FIG. 19 shows an alternative configuration of a transmission which can be operated with the method according to the invention. With the configuration which otherwise corresponds to FIG. 3 et seq., an additional countershaft 15' with associated components 19', 20', 32', 33', 34', 35', which transmit power in parallel with the transmission elements of the countershaft 15 according to FIG. 3, is provided in addition to the countershaft 15 with associated components 19, 20, 32, 33, 34, 35. In this context, the power is distributed in halves between the countershafts 15 and 15', as a result of which it is possible to act on the countershafts with associated components. The method according to the invention can easily also be applied for transmissions with two countershafts.

As an alternative to the embodiments illustrated above it is possible for the countershaft to be coupled to the drive train at the output end in the direct gear in that, when the gear shifting element is in the shifted position 16-II, the gear shifting element 30 is moved into the shifted position 30-I or 30-III or else the gear shifting element 31 is moved into the shifted position 31-I or 31-III.

A selection of the gear shifting elements 16, 30, 31 to be shifted in order to couple the countershaft
- in accordance with a desired transmission ratio in the direction of the countershaft and/or
- with respect to an expected gear which is expected when there is a change from the illustrated direct gear.

Figure 20:
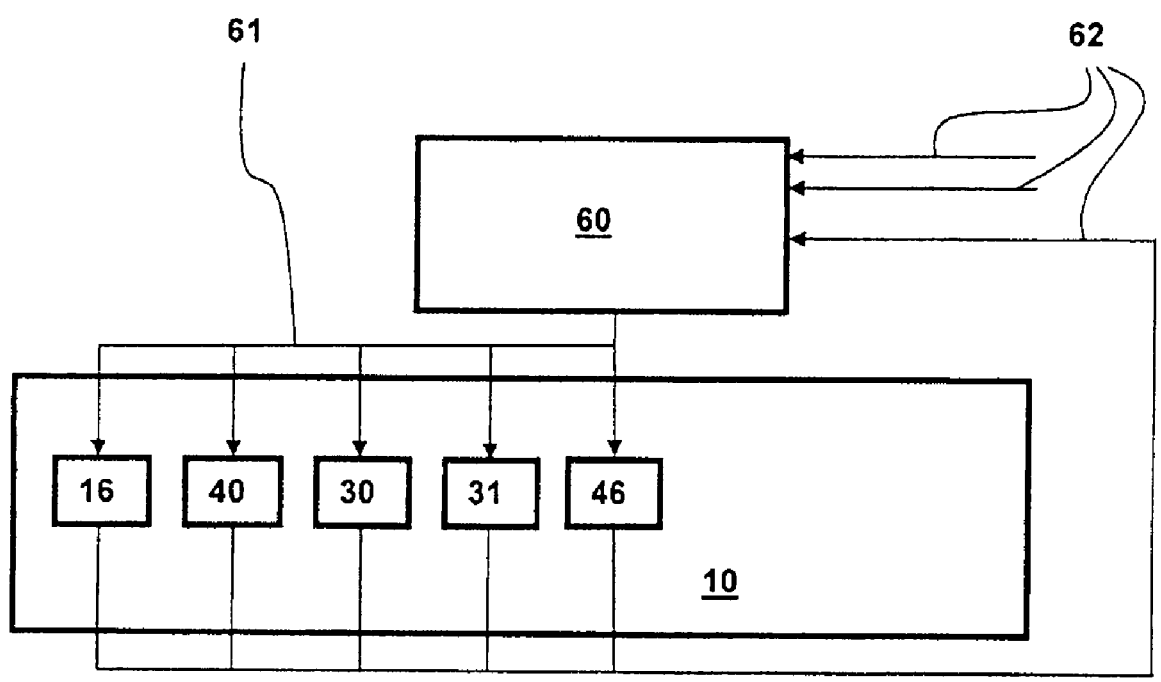
FIG. 20 shows a schematic structural diagram of a transmission with control unit, control lines and signal connections for carrying out the method according to the invention.

FIG. 20 shows the interaction between the control unit 60 and the transmission 10. By means of suitable control instructions to actuators the control unit 60 influences the positions of the gear shifting elements 16, 40, 30, 31, 46 by means of control lines 61. Parameters and measurement signals relating to the operating conditions are fed to the control unit 60 via signal connections 62.

What is claimed is:

1. An automated shift transmission for a motor vehicle having a plurality of discrete transmission stages, comprising
    a) a first component transmission (11) of a reduction gearing design, and
    b) a further component transmission (12) which has a trans-mission stage with a plurality of transmission elements forming drive elements or output elements (sun-wheel 41; planet wheel 42; internal gearwheel 45; web 43), wherein
    c) for at least one gear (1st to 7th gear) power is transmitted via a single power path, and
    d) for at least one gear (8th to 12th gear) in the first component transmission (11) power branching between at least two power paths takes place and both power paths are combined in the further component transmission (12),
    e) the first component transmission (11) having output gear-wheels (36-39) adapted to be connected to a transmission shaft (output shaft 25) via gear shifting elements (40, 46), wherein the transmission shaft (output shaft 25) can be connected via a gear shifting element (40) to a trans-mission element (sun wheel 41) of the further component transmission (12) and can be connected via a further gear shifting element (46) to another transmission element (internal gearwheel 45) of the further component transmission (12), and
    f) a gear shifting element (40), which
    in a first shifted state (40-I) couples a transmission element (sun wheel 41) of the further component transmission (12) to the transmission input shaft (14),
    in a second shifted state (40-II) couples the transmission input, shaft (14) both to the transmission element (sun wheel 41) of the further component transmission (12) and to another transmission element (internal gearwheel 45) of the further component transmission (12), and
    in a third shifted state (40-III) couples the transmission element (sun wheel 41) of the further component transmission (12) to another transmission element (internal gear-wheel 45) of the further component transmission (12) for causing the transmission element components to rotate in unison.

2. The transmission as claimed in claim 1, wherein the transmission has a direct gear (13th gear).

3. The transmission as claimed in claim 1, wherein step jumps between respectively adjacent gears are smaller for high gear speeds than for low gear speeds.

4. The transmission as claimed in claim 3, wherein the step jump between a first gear and a second gear is greater than between the following higher gears.

5. The transmission as claimed in claim 1, wherein in order to block the further component transmission (12) in the direct gear (13th gear) a gear shifting element (40) connects a sun wheel (41) to an internal gearwheel (45) so as to rotate with it.

6. The transmission as claimed in claim 1, wherein the first component transmission (11) includes a split transmission (13) permitting the use of a component gear (gear-wheel pair 27) of the first component transmission (11) for different shifted states (16-I and 16-III) of the split trans-mission (13) with the same shifted state (46-III) of the further component transmission stage (12) in two over-all transmission ratios (2nd gear and 4th gear) of the transmission.

7. The transmission as claimed in claim 6, wherein the split transmission 13 has forward gears with a 13th direct gear and gears 8 to 12 which have power branching and in which one transmission element (sun wheel 41) a planetary gear set forming the multi-element transmission stage (12) is driven via a direct gear (transmission input shaft 14, gear shifting element 40, main shaft 23) of the first component transmission (11).

8. The transmission as claimed in claim 7, wherein in first forward gears, (in particular in the forward gears 1 to 6), the first component transmission (11) is drivingly connected to the sunwheel (41) of the planetary gear set (12), the internal gearwheel (45) of the planetary gear set (12) is connected to the housing (47) via a brake and power is output from the planetary gear set (12) via a web (43) supporting the planetary gears of the planetary gear set (12).

9. An automated shift transmission for a motor vehicle having a plurality of discrete transmission stages, comprising
   a) a first component transmission (11) of a reduction gearing design, and
   b) a further component transmission (12) which has a trans-mission stage with a plurality of transmission elements forming drive elements or output elements (sun wheel 41; planet wheel 42; internal gearwheel 45; web 43), wherein
   c) for at least one gear (1st to 7th gear) power is transmitted via a single power path, and
   d) for at least one gear (8th to 12th gear) in the first component transmission (11) power branching between two power paths takes place and both power paths are combined in the further component transmission (12),
   e) a transmission input shaft (14) and a countershaft (15), with first and second input constants (17, 18) are intermediately connected between the transmission input shaft (14) and the countershaft (15), and
   f) a control device (60) is provided which, in a direct gear, depending on the operating conditions
      fa) couples the transmission input shaft (14) to the countershaft (15) by means of a shifting element (16) having opposite shifting positions via the first input constant (17) in one shifted position (16-I) of the gear shifting element (16), and
      fb) couples the transmission input shaft (14) to the countershaft (15) by means of the second input constant (17) in the opposite shifted position (16-III) of the gear shifting element (16).

10. The transmission as claimed in claim 9, wherein, including a power branching arrangement, having two power branches wherein,
    one power branch extends via the countershaft (15), and
    the other power branch is formed before the combination of the two power branches without the involvement of inter-meshing gearwheel pairs and with the transmission ratio i=1.

11. The transmission as claimed in claim 10, wherein the direct gear (13th gear) is the highest gear.

12. The transmission as claimed in claim 10, wherein at least one gear (8th to 12th gear) in which the power branching takes place is adjacent to the direct gear (13th gear).

13. The transmission as claimed in claim 10, wherein a gear without power branching is provided between two gears with power branching.

14. The transmission as claimed in claim 10, wherein at least one reverse gear has power branching.

15. The transmission as claimed in claim 9, wherein via the control device (60) in the direct gear it is possible, in operating ranges in which the control device predicts a future braking process, to connect the countershaft (15) in an automated fashion, by activating a gear shifting element (16; 30; 31) to the transmission element (transmission input shaft 14, main shaft 23, output shaft 25) which conducts power in the direct gear.

16. The transmission as claimed in claim 9, wherein via the control device (60) in the direct gear it is possible to connect the countershaft (15) in an automated fashion, by activating a gear shifting element (16; 30; 31), to the transmission elements (transmission input shaft 14, main shaft 23, output shaft 25) which conduct power in the direct gear, for conditions in which the control device predicts a future change from the direct gear into a gear in which the drive power is provided at least partially by an input shaft (14) to an output shaft (44) via a countershaft (15).

17. The transmission as claimed in claim 16, wherein a control device, when there is a change into the direct gear, the control device (60) tests an activation criterion and if the activation criterion is fulfilled activates in an automated fashion a gear shifting element (16; 30; 31) which decouples the countershaft (15) from the input shaft (14) and the output shaft (44).

* * * * *